United States Patent
Bhavaraju et al.

(10) Patent No.: US 10,056,651 B2
(45) Date of Patent: *Aug. 21, 2018

(54) LOW TEMPERATURE SECONDARY CELL WITH SODIUM INTERCALATION ELECTRODE

(71) Applicant: FIELD UPGRADING USA, INC., Madison, WI (US)

(72) Inventors: Sai Bhavaraju, West Jordan, UT (US); Mathew Robins, Saratoga Springs, UT (US)

(73) Assignee: FIELD UPGRADING USA, INC., Denver, CO (US)

(*) Notice: Subject to any disclaimer, the term of this patent is extended or adjusted under 35 U.S.C. 154(b) by 618 days.

This patent is subject to a terminal disclaimer.

(21) Appl. No.: 14/205,019

(22) Filed: Mar. 11, 2014

(65) Prior Publication Data

US 2014/0212707 A1 Jul. 31, 2014

Related U.S. Application Data

(63) Continuation-in-part of application No. 13/290,716, filed on Nov. 7, 2011, now Pat. No. 8,968,902.

(Continued)

(51) Int. Cl.
*H01M 10/39* (2006.01)
*H01M 4/505* (2010.01)
(Continued)

(52) U.S. Cl.
CPC .......... *H01M 10/399* (2013.01); *H01B 1/122* (2013.01); *H01M 4/505* (2013.01);
(Continued)

(58) Field of Classification Search
None
See application file for complete search history.

(56) References Cited

U.S. PATENT DOCUMENTS 3,546,021 A 12/1970 Craig
3,847,667 A 11/1974 Werth
(Continued)

FOREIGN PATENT DOCUMENTS

EP 2485317 8/2012
EP 2490293 8/2012
(Continued)

OTHER PUBLICATIONS

Eoff, Anca "Non-Final Office Action", U.S. Appl. No. 14/298,302, (dated Nov. 18, 2015), 1-19.
(Continued)

*Primary Examiner* — Maria Laios
*Assistant Examiner* — Robert S Carrico
(74) *Attorney, Agent, or Firm* — Foley & Lardner LLP

(57) ABSTRACT

The present invention provides a molten sodium secondary cell. In some cases, the secondary cell includes a sodium metal negative electrode, a positive electrode compartment that includes a positive electrode disposed in a molten positive electrolyte comprising Na—FSA (sodium-bis(fluorosulonyl)amide), and a sodium ion conductive electrolyte membrane that separates the negative electrode from the positive electrolyte. One disclosed example of electrolyte membrane material includes, without limitation, a NaSICON-type membrane. The positive electrode includes a sodium intercalation electrode. Non-limiting examples of the sodium intercalation electrode include $Na_xMnO_2$, $Na_xCrO_2$, $Na_xNiO$, and $Na_xFe_y(PO_4)_z$. The cell is functional at an operating temperature between about 100° C. and about 150° C., and preferably between about 110° C. and about 130° C.

10 Claims, 1 Drawing Sheet

Related U.S. Application Data

(60) Provisional application No. 61/779,857, filed on Mar. 13, 2013, provisional application No. 61/410,812, filed on Nov. 5, 2010.

(51) Int. Cl.
  *H01M 10/054* (2010.01)
  *H01M 10/0562* (2010.01)
  *H01M 4/38* (2006.01)
  *H01B 1/12* (2006.01)

(52) U.S. Cl.
  CPC ..... *H01M 10/054* (2013.01); *H01M 10/0562* (2013.01); *H01M 4/381* (2013.01); *H01M 2300/002* (2013.01); *H01M 2300/0022* (2013.01)

(56) References Cited

U.S. PATENT DOCUMENTS

| | | |
|---|---|---|
| 3,969,138 A | 7/1976 | Werth et al. |
| 4,020,246 A | 4/1977 | Seo et al. |
| 4,162,351 A | 7/1979 | Putt et al. |
| 4,244,986 A | 1/1981 | Paruso et al. |
| 4,307,164 A | 12/1981 | Church et al. |
| 4,335,191 A | 6/1982 | Peled |
| 4,375,501 A | 3/1983 | Peled et al. |
| 4,427,747 A | 1/1984 | Bennett et al. |
| 4,465,744 A | 8/1984 | Susman et al. |
| 4,485,154 A | 11/1984 | Remick et al. |
| 4,546,055 A | 10/1985 | Coetzer et al. |
| 4,579,796 A | 4/1986 | Muramatsu |
| 4,684,590 A | 8/1987 | Sammells |
| 4,753,858 A | 6/1988 | Jow |
| 4,891,281 A | 1/1990 | Kuo et al. |
| 4,894,298 A | 1/1990 | Vukson et al. |
| 4,973,534 A | 11/1990 | Adendorff et al. |
| 5,019,466 A | 5/1991 | Coetzer et al. |
| 5,051,325 A | 9/1991 | Shishikura et al. |
| 5,053,294 A | 10/1991 | Sernka et al. |
| 5,139,897 A | 8/1992 | Wedlake |
| 5,264,298 A | 11/1993 | Townsend |
| 5,290,405 A | 3/1994 | Joshi et al. |
| 5,422,197 A | 6/1995 | Zito |
| 5,525,442 A | 6/1996 | Shuster |
| 5,552,244 A | 9/1996 | Griffin et al. |
| 5,563,006 A | 10/1996 | Von Benda et al. |
| 5,604,053 A | 2/1997 | Coetzer et al. |
| 5,648,183 A | 7/1997 | Licht et al. |
| 5,686,201 A | 11/1997 | Chu |
| 6,007,943 A | 12/1999 | Coetzer |
| 6,030,720 A | 2/2000 | Chu |
| 6,033,343 A | 3/2000 | Licht |
| 6,033,796 A | 3/2000 | Baji |
| 6,187,479 B1 | 2/2001 | Liu |
| 6,270,923 B1 | 8/2001 | Bito et al. |
| 6,376,123 B1 | 4/2002 | Chu |
| 6,410,181 B1 | 6/2002 | Spillman et al. |
| 6,852,450 B2 | 2/2005 | Hwang et al. |
| 6,881,234 B2 | 4/2005 | Towsley |
| 7,273,680 B2 | 9/2007 | Durkot et al. |
| 7,314,681 B2 | 1/2008 | Randell |
| 7,632,604 B2 | 12/2009 | Iacovangelo et al. |
| 8,012,621 B2 | 9/2011 | Joshi et al. |
| 8,168,321 B2 | 5/2012 | Shelekhin et al. |
| 8,883,339 B2 | 11/2014 | Choi |
| 8,968,902 B2 | 3/2015 | Coors et al. |
| 2002/0150818 A1 | 10/2002 | Amatucci et al. |
| 2002/0172871 A1 | 11/2002 | Schucker |
| 2002/0192553 A1 | 12/2002 | Barker et al. |
| 2003/0013021 A1 | 1/2003 | Wariishi |
| 2004/0065543 A1 | 4/2004 | Kovarsky |
| 2005/0016857 A1 | 1/2005 | Kovarsky et al. |
| 2005/0109617 A1 | 5/2005 | Ono et al. |
| 2005/0260460 A1 | 11/2005 | Kishi et al. |
| 2006/0141346 A1 | 6/2006 | Gordon et al. |
| 2006/0177732 A1 | 8/2006 | Visco et al. |
| 2006/0226022 A1 | 10/2006 | Balagopal et al. |
| 2006/0257734 A1 | 11/2006 | Obata et al. |
| 2007/0048610 A1 | 3/2007 | Tsang |
| 2007/0154762 A1 | 7/2007 | Schucker |
| 2007/0221265 A1 | 9/2007 | Affinito et al. |
| 2008/0268327 A1 | 10/2008 | Gordon et al. |
| 2009/0061288 A1 | 3/2009 | Gordon et al. |
| 2009/0134040 A1 | 5/2009 | Gordon et al. |
| 2009/0134842 A1 | 5/2009 | Joshi et al. |
| 2009/0136830 A1 | 5/2009 | Gordon |
| 2009/0189567 A1 | 7/2009 | Joshi et al. |
| 2009/0212743 A1 | 8/2009 | Hagiwara et al. |
| 2010/0044241 A1 | 2/2010 | Pendleton et al. |
| 2010/0089762 A1 | 4/2010 | Gordon |
| 2010/0239893 A1 | 9/2010 | Gordon et al. |
| 2010/0261051 A1 | 10/2010 | Okada et al. |
| 2010/0279174 A1 | 11/2010 | Young |
| 2010/0285372 A1 | 11/2010 | Lee et al. |
| 2010/0297537 A1 | 11/2010 | Coors et al. |
| 2011/0057135 A1 | 3/2011 | Kim |
| 2011/0104526 A1 | 5/2011 | Boxley et al. |
| 2011/0104570 A1 | 5/2011 | Galloway et al. |
| 2011/0199042 A1 | 8/2011 | Abe |
| 2011/0223460 A1 | 9/2011 | Farmer |
| 2012/0015256 A1 | 1/2012 | Komaba et al. |
| 2012/0021273 A1 | 1/2012 | Ohmori et al. |
| 2012/0045695 A1 | 2/2012 | Sheem et al. |
| 2012/0061823 A1 | 3/2012 | Wu et al. |
| 2012/0126752 A1 | 5/2012 | Joshi et al. |
| 2012/0129056 A1* | 5/2012 | Majima .......... H01M 4/04 429/339 |
| 2012/0141856 A1 | 6/2012 | Gordon et al. |
| 2012/0164524 A1 | 6/2012 | Bogdan et al. |
| 2012/0214043 A1 | 8/2012 | Olschimke et al. |
| 2012/0219833 A1 | 8/2012 | Coors et al. |
| 2012/0219838 A1 | 8/2012 | Terada et al. |
| 2012/0219843 A1 | 8/2012 | Bogdan et al. |
| 2012/0315548 A1 | 12/2012 | Fujikawa et al. |
| 2013/0052525 A1 | 2/2013 | Kageura et al. |
| 2013/0130085 A1 | 5/2013 | Choi |
| 2013/0196224 A1 | 8/2013 | Kim et al. |
| 2014/0170443 A1 | 6/2014 | Bhavaraju et al. |
| 2014/0210422 A1 | 7/2014 | Bhavaraju et al. |
| 2014/0212707 A1 | 7/2014 | Bhavaraju et al. |
| 2015/0086826 A1 | 3/2015 | Bhavaraju et al. |

FOREIGN PATENT DOCUMENTS

| | | |
|---|---|---|
| EP | 2 935 655 A1 | 10/2015 |
| EP | 2 973 832 A1 | 1/2016 |
| FR | 2301108 | 9/1976 |
| FR | 2518320 | 6/1983 |
| GB | 0 215 996 | 5/1924 |
| GB | 2294803 | 5/1996 |
| JP | S56-096464 A | 8/1981 |
| JP | S59-128778 A | 7/1984 |
| JP | S60-054180 A | 3/1985 |
| JP | H04-230963 | 8/1992 |
| JP | H04-249869 A | 9/1992 |
| JP | 08321322 | 12/1996 |
| JP | 10-162807 | 6/1998 |
| JP | H10-162807 A | 6/1998 |
| JP | 2001-043854 A | 2/2001 |
| JP | 2003-272616 A | 9/2003 |
| JP | 2004178991 | 6/2004 |
| JP | 2008-293678 | 12/2008 |
| JP | 2008-300173 | 12/2008 |
| JP | 2009009933 | 1/2009 |
| JP | 2011-081971 | 4/2011 |
| JP | WO 2011111566 A1 * | 9/2011 ............ H01M 4/04 |
| JP | 2013-048077 A | 3/2013 |
| JP | 2016-516274 A | 6/2016 |
| JP | 2016-516275 A | 6/2016 |
| KR | 20100027321 | 3/2010 |
| KR | 20130098236 | 9/2013 |
| WO | WO-94/16468 | 7/1994 |
| WO | WO2010110465 | 9/2010 |

(56) References Cited

FOREIGN PATENT DOCUMENTS

| WO | WO2010135283 | 11/2010 |
|---|---|---|
| WO | WO2011104805 | 9/2011 |
| WO | WO2011111566 | 9/2011 |
| WO | WO2012132813 | 4/2012 |
| WO | WO-2012/061823 | 5/2012 |
| WO | WO2012117916 | 7/2012 |
| WO | 2012114951 | 8/2012 |
| WO | WO-2012/114951 | 8/2012 |
| WO | WO2012115786 | 8/2012 |
| WO | WO-2013/154349 A1 | 10/2013 |
| WO | WO-2014/159542 | 10/2014 |

OTHER PUBLICATIONS

Barcena, Carlos "Non Final Office Action", U.S. Appl. No. 14/292,130, (dated Dec. 8, 2015), 1-9.
Hueso, et al., "High Temperature Sodium Batteries: Status, challenges and future trends", *Energy & Environmental Science*, 2013, 6, 734-749, (Jan. 14, 2013), 734-749.
Sudworth, J.L. "The sodium/nickel chloride (ZEBRA) battery", *Journal of Power Sources* 100 (2001) 149-163, (Jan. 1, 2001), 149-163.
Shin, Ju C., "International Search Report", PCT Application No. PCT/US14/41329 (Corresponding to U.S. Appl. No. 14/298,302), (dated Oct. 2, 2014), 1-3.
Shin, Ju C., "Written Opinion of the International Searching Authority", PCT Application No. PCT/US14/413929 (Corresponding to U.S. Appl. No. 14/298.302), (dated Oct. 2, 2014), 1-6.
Kim, et al., "The Role of Additives in the Electroreduction of Sodium Ions in Chloroaluminate-Based Ionic Liquids", *Journal of The Electrochemical Society*, 2005, vol. 152, No. 1, pp. E9-E13, (Dec. 1, 2004),E9-E13.
Lang, et al., "Catalytic additivies for the reversible reduction of sodium in chloroaluminate ionic liquids", *Electrochimica Acta*, 2006, vol. 51, Iss. 19, pp. 3884-3889, (Dec. 27, 2005),3884-3889.
Choi, Sang W., "International Search Report", PCT Application No. PCT/US2014/0423698 (Corresponding to U.S. Appl. No. 14/205,019), (dated Jul. 29, 2014), 1-3.
Choi, Sang W., "Written Opinion of the International Searching Authority", PCT Application No. PCT/US2014/0423698 (Corresponding to U.S. Appl. No. 14/205,019), (dated Jul. 29, 2014), 1-6.
Shin, Ju C., "International Search Report", PCT Application No. PCT/US2014/40297 (Corresponding to U.S. Appl. No. 14/292,130), (dated Sep. 25, 2014), 1-3.
Shin, Ju C., "Written Opinion of the International Searching Authority", PCT Application No. PCT/US2014/40297 (Corresponding to U.S. Appl. No. 14/292,130), (dated Sep. 25, 2014), 1-6.
Shozo, Fujiwara "English Language Abstract", JP2009009933, (Jan. 15, 2009), 1.
Cho, Han S., "International Search Report", PCT Application No. PCT/US14/57462 (Corresponding to U.S. Appl. No. 14/496,509 8000.2.48), (dated Jan. 9, 2015), 1-3.
Cho, Han S., "Written Opinion of the International Searching Authority", PCT Application No. PCT/US14/57462 (Corresponding to U.S. Appl. No. 14/496,5098000.2.48), (dated Jan. 9, 2015), 1-4.
Shin, Ju C., "International Search Report", PCT Application No. PCT/US2014/024066 (Corresponding to U.S. Appl. No. 14/205,772: 8000.2.41), (dated Jun. 27, 2014), 1-3.
Shin, Ju C., "Written Opinion of the International Searching Authority", PCT Application No. PCT/US2014/024066 (Corresponding to U.S. Appl. No. 14/205,772), (dated Jun. 27, 2014), 1-6.
Li, et al., "Rechargeable Ni-Li Battery Integrated Aqueous/Non Aqueous System", *Energy Technology Research Institute, National Institute of Advanced Industrial Science and Technology*, (Oct. 5, 2009), 15098-15099.
Carrico, Robert S., "Non-Final Office Action", U.S. Appl. No. 13/290,716, (dated Jul. 22, 2014), 1-15.
Carrico, Robert S., "Notice of Allowance", U.S. Appl. No. 13/290,716, (dated Oct. 29, 2014), 1-8.

Cho, Ki Y., "International Search Report", PCT application US2011/059624 (Corresponding to U.S. Appl. No. 13/290,716), (dated May 22, 2012), 1-3.
Cho, Ki Y., "Written Opinion of the International Searching Authority", PCT application US2011/059624 (Corresponding to U.S. Appl. No. 13/290,716), (dated May 22, 2012), 1-3.
Totsuka, Kazuhide "Patent Abstracts of Japan (JP 08-321322)", English Language Abstract of Japanese patent publication JP JP 08-321322, (Dec. 3, 1996),1.
Bito, et al., "Bibliographical Data and Abstract of JP2004178991", Japanese Published Patent Application JP 2004178991, (Jun. 24, 2004), 1.
Wang, et al., "Room temperature Na/S batteries with sulfur composite Cathode Material", *Electrochemistry Communications* 9 (2007), Elsevier, (Jun. 18, 2006),31-34.
Shin, Ju C., "International Search Report", PCT Application No. PCT/US2014/054339 (Corresponding to U.S. Appl. No. 14/478,676, (dated Dec. 15, 2014), 1-3.
Shin, Ju C., "Written Opinion of the International Searching Authority", PCT Application No. PCT/US2014/054339 (Corresponding to U.S. Appl. No. 14/478,676, (dated Dec. 15, 2014), 1-3.
Yuki, Saori "Japanese Office Action", Japanese App No. JP2013-537914, (dated Sep. 8, 2015), 1-8.
Motohiro, Fukuhara "English Language Abstract", KR20100027321, (dated Mar. 11, 2010), 1.
Soo, et al., "English Language Abstract", KR20130098236, (dated Sep. 4, 2013), 1.
Steinreiber, J., "European Search Report", European Patent Application No. 14779822.7, dated Sep. 1, 2016, 1-10.
Steinreiber, J., "European Search Report", European Patent Application No. 14744153.2, dated Sep. 1, 2016, 1-12.
Vij, , "Cobalt (II) and Nickel (II) Bis (fluorosulphuryl) preparation and characterization", Bulletin De La Societe Chimique De France, Societe Francaise De Chime. Paris, France. vol. 3, Jan. 1, 1989 (Jan. 1, 1989), pp. 331-333, Jan. 1, 1989, 1-3.
Walls, Cynthia K., "Notice of Allowance", U.S. Appl. No. 14/496,509, dated Aug. 24, 2016, 1-15.
Barcena, Carlos, "Non Final Office Action", U.S. Appl. No. 14/292,130, dated Dec. 8, 2015, 1-9.
Barcena, Carlos, "Notice of Allowance", U.S. Appl. No. 14/292,130, dated May 5, 2016, 1-13.
Carrico, Robert S., "Non Final Office Action", U.S. Appl. No. 14/205,772, dated Jul. 5, 2016, 1-21.
Carrico, Robert S., "Non Final Office Action", U.S. Appl. No. 14/205,019, dated Jul. 15, 2016, 1-22.
Eoff, Anca, "Final Office Action", U.S. Appl. No. 14/298,302, dated May 9, 2016, 1-17.
Eoff, Anca, "Non-Final Office Action", U.S. Appl. No. 14/298,302, dated Nov. 18, 2015, 1-19.
Fujikawa, , "English Bibliographic Data: WO2011104805", Sep. 1, 2011.
Ito, et al., "English Bibliographic Data: WO2012132813", Oct. 4, 2012.
Majima, et al., "English Bibliographic Data: WO2011111566", Sep. 15, 2011.
Muralidar, Richard V., "Notice of Allowance", U.S. Appl. No. 14/478,676, dated May 9, 2016, 1-15.
NITTA, , "English Bibliographic Data: WO2012117916", Sep. 7, 2012.
Ohmori, et al., "English Bibliographic Data: WO2010110465", Sep. 30, 2010.
Carrico, Robert S., "Final Office Action", U.S. Appl. No. 14/205,772, dated Feb. 9, 2017, 1-15.
Carrico, Robert S., "Final Office Action", U.S. Appl. No. 14/205,019, dated Jan. 26, 2017, 1-21.
Eoff, Anca, "Non-Final Office Action", U.S. Appl. No. 14/298,302, dated Apr. 6, 2017, 1-13.
Jarvi, Tommi, "European Search Report", European Patent Application No. EP14808453, dated Dec. 1, 2016, 1-12.
Lee, Dong W., "International Search Report", PCT Application No. PCT/US16/27930 (Corresponding to U.S. Appl. No. 15/130,741)., dated Jul. 26, 2016, 1-3.

(56) References Cited

OTHER PUBLICATIONS

Lee, Dong W., "Written Opinion of the International Searching Authority", PCT Application No. PCT/US16/27930 (Corresponding to U.S. Appl. No. 15/130,741), dated Jul. 26, 2016, 1-5.
"Notice of Allowance", Japanese Patent Application 2012-537241 (8000.2.26JP) (dated May 11, 2015), 1-6.
European Examination Report in European Patent Application No. 12783042.0 dated Mar. 1, 2016.
Examination Report in Australian Patent Application No. 2013364191 dated Apr. 4, 2017.
Final Office Action in Japanese Patent Application No. 2012-537241 dated Jun. 17, 2014.
Final Office Action in Japanese Patent Application No. 2014-510410 (Japanese Version) dated Apr. 5, 2001.
Final Office Action in Japanese Patent Application No. 2014-510410 dated Apr. 5, 2016.
Final Office Action in U.S. Appl. No. 13/466,844 dated Aug. 11, 2015.
Final Office Action in U.S. Appl. No. 14/019,651 dated Dec. 17, 2015.
Final Office Action in U.S. Appl. No. 14/040,241 dated May 18, 2016.
Final Office Action in U.S. Appl. No. 14/511,031 dated Nov. 3, 2016.
Final Office Action in U.S. Appl. No. 12/940,864 dated Jan. 29, 2014.
Grenness, Morten, "US Publication of", FR2301108, Dec. 20, 1977, 1-8.
International Search Report in International App. No. PCT/US2010/055718 dated Jun. 21, 2011.
International Search Report in PCT App. No. PCT/US08/10435 dated Nov. 25, 2008.
International Search Report in PCT Application No. PCT/US2013/058403 dated Dec. 2, 2013.
International Search Report in PCT Application No. PCT/US13/62386 dated Dec. 23, 2013.
International Search Report in PCT Application No. PCT/US2014/059954 dated Jan. 20, 2015.
International Search Report in PCT Application No. PCT/US2015/063244 dated Mar. 18, 2016.
International Search Report on PCT/US2014/023698 dated Jul. 29, 2014.
International Serach Report in PCT Application No. PCT/US13/68552 dated Jan. 24, 2014.
Japanese Office Action in 2015-534766 dated Apr. 4, 2017.
Japanese Office Action on application No. 20130537914. dated May 31, 2016.
Japanese Office Action on application No. 2016-501410 dated Sep. 5, 2017.
Japanese Office Action on JP2016501320 dated Sep. 5, 2017.
Internationial Search Report in PCT App. No. PCT/US2012/036959 dated Nov. 23, 2012.
Masatsugu, Morimitsu "English Lanuage Abstract", JP2008293678, (Dec. 4, 2008), 1.
Non Final Office Action in U.S. Appl. No. 13/466,844 dated Feb. 26, 2015.
Non Final Office Action in U.S. Appl. No. 14/469,865 dated Apr. 7, 2015.
Non Final Office Action in U.S. Appl. No. 13/466,844 dated Mar. 23, 2016.
Non Final Office Action in U.S. Appl. No. 13/466,844 dated May 19, 2017.
Non Final Office Action in U.S. Appl. No. 13/466,844 dated Oct. 7, 2016.
Non Final Office Action in U.S. Appl. No. 14/511,031 dated Apr. 12, 2016.
Non Final Office Action in U.S. Appl. No. 14/072,468 dated Oct. 5, 2015.
Non Final Office Action on U.S. Appl. No. 12/205,759, dated Apr. 5, 2013.
Non-Final Office Action in Japanese Patent Application No. 2014-510410 (English Translation) dated Nov. 10, 2015.
Non-Final Office Action in Japanese Patent Application No. 2014-510410 dated Nov. 10, 2015.
Non-Final Office Action in U.S. Appl. No. 14/040,241 dated Oct. 28, 2015.
Non-Final Office Action in U.S. Appl. No. 14/019,651 dated Aug. 17, 2015.
Non-Final Office Action in U.S. Appl. No. 12/940,864 dated Jun. 18, 2013.
Notice of Allowance in Japanese Patent Application No. 2014-510410 dated Aug. 9, 2016.
Notice of Allowance in U.S. Appl. No. 14/019,651 dated Mar. 31, 2016.
Notice of Allowance in U.S. Appl. No. 14/072,468 dated Apr. 28, 2016.
Notice of Allowance in U.S. Appl. No. 12/940,864 dated Jun. 20, 2014.
Office Action in U.S. Appl. No. 12/205,759 dated Apr. 13, 2011.
Office Action in U.S. Appl. No. 12/205,759 dated Sep. 16, 2010.
Peramunage, et al., "A Solid Sulfur Cathode for Aqueous Batteries", Science, vol. 261, (Aug. 20, 1993), 1029-1032.
Salminen, Justin et al., "Ionic liquids for rechargeable lithium batteries", Lawrence Berkeley National Laboratory (Sep. 21), 1-19.
Search Report in European Patent Application No. 13834937.8 dated Mar. 18, 2016.
Search Report in European Patent Application No. 13842649.9 dated Apr. 26, 2016.
Search Report in European Patent Application No. 13865228.4 dated Jul. 15, 2016.
Search Report in European Patent Application No. EP10829189.9 dated Nov. 18, 2016.
Supplementary European Search Report in European Patent Application No. 12783042.0 dated Oct. 14, 2014.
U.S. Office Action dated Oct. 28, 2015.
U.S. Office Action in U.S. Appl. No. 14/040,241 dated Feb. 24, 2017.
U.S. Office Action in U.S. Appl. No. 14/040,241 dated May 18, 2016.
U.S. Office Action in U.S. Appl. No. 14/040,241 dated Oct. 4, 2017.
Written Opinion in International App. No. PCT/US2010/055718 dated Jun. 21, 2011.
Written Opinion of the International Search Authority in PCT Application No. PCT/US2013/6238 dated Dec. 23, 2014.
Written Opinion of the International Searching Authority in PCT App. No. PCT/US08/10435 dated Nov. 25, 2008.
Written Opinion of the International Searching Authority in PCT App. No. PCT/US2012/036959 dated Nov. 23, 2012.
Written Opinion of the International Searching Authority in PCT Application No. PCT/US2013/68552 dated Jan. 24, 2014.
Written Opinion of the International Searching Authority in PCT Application No. PCT/US2013/058403 dated Dec. 2, 2013.
Written Opinion of the International Searching Authority in PCT Application No. PCT/US2014/059954 dated Jan. 2015.
Written Opinion of the International Searching Authority in PCT Application No. PCT/US2015/63244 dated Mar. 18, 2016.
Zhang, et al., "A Reveiw of the Electrochemical Performance of Alloy Anodes for Lithium-ion Batteries", Journal of Power Sources, Elsevier SA, CH, vol. 196, No. 1, Jan. 1, 2011, 13-24.

\* cited by examiner

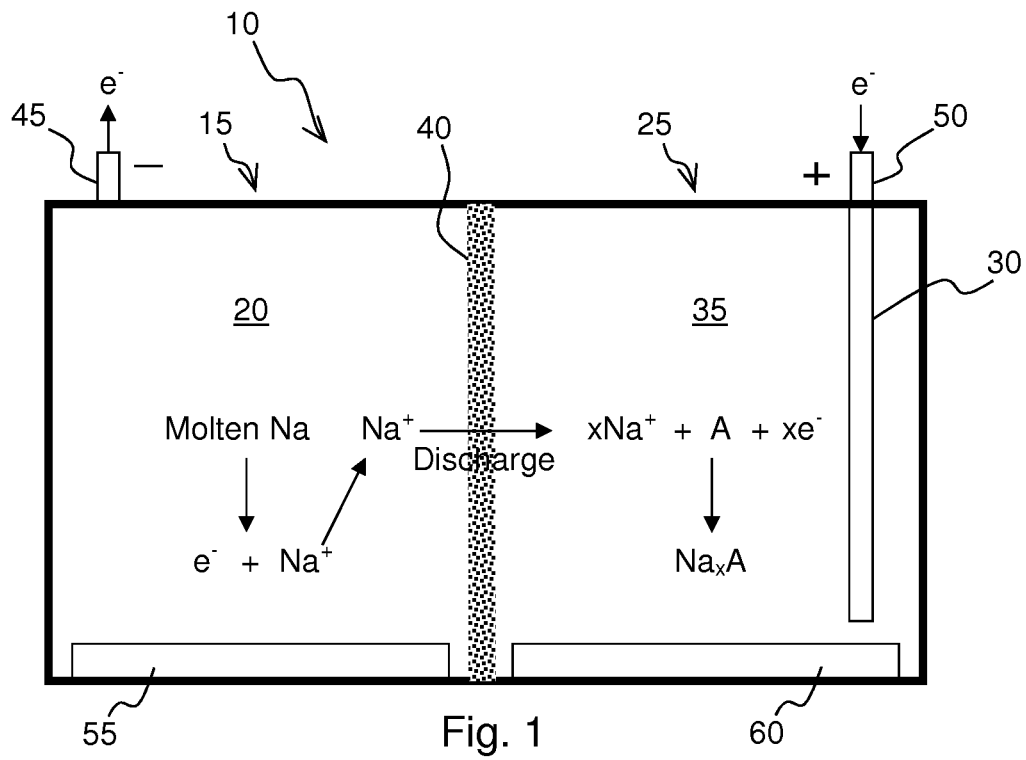
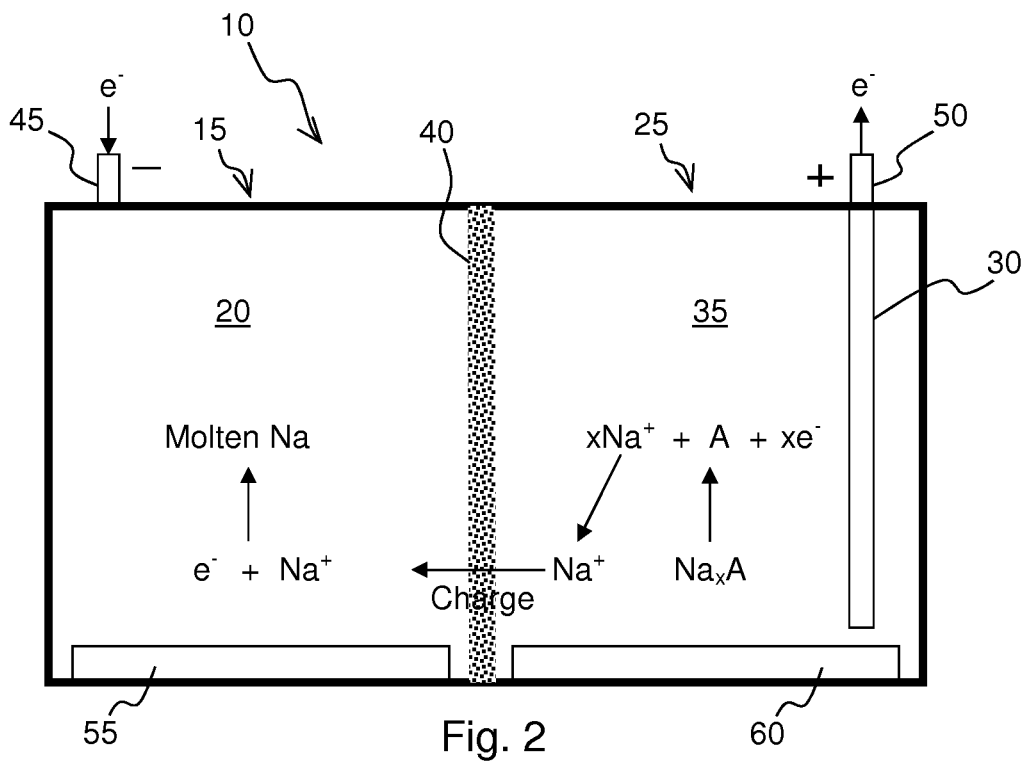

LOW TEMPERATURE SECONDARY CELL WITH SODIUM INTERCALATION ELECTRODE

RELATED APPLICATIONS

This application claims priority to U.S. Provisional Patent No. 61/779,857 filed on Mar. 13, 2013. This application is also a continuation-in-part and claims priority to U.S. application Ser. No. 13/290,716 filed Nov. 7, 2011 and titled LOW TEMPERATURE MOLTEN SODIUM SECONDARY CELL WITH SODIUM ION CONDUCTIVE ELECTROLYTE MEMBRANE which application claimed priority to U.S. Application No. 61/410,812 filed on Nov. 5, 2010. These applications are hereby incorporated by reference.

FIELD OF THE INVENTION

The present invention relates in general to batteries. More particularly, the present invention provides a molten sodium-based secondary cell (or rechargeable battery) that operates at a temperature between about 100° Celsius ("C") and about 150° C. The disclosed secondary cell utilizes a sodium ion conductive electrolyte membrane separating the molten sodium negative electrode from a sodium intercalation electrode in a molten sodium-FSA (sodium-bis(fluorosulfonyl)amide) electrolyte.

BACKGROUND OF THE INVENTION

Batteries are known devices that are used to store and release electrical energy for a variety of uses. In order to produce electrical energy, batteries typically convert chemical energy directly into electrical energy. Generally, a single battery includes one or more galvanic cells, wherein each of the cells is made of two half-cells that are electrically isolated except through an external circuit. During discharge, electrochemical reduction occurs at the cell's positive electrode, while electrochemical oxidation occurs at the cell's negative electrode. While the positive electrode and the negative electrode in the cell do not physically touch each other, they are generally chemically connected by at least one (or more) ionically conductive and electrically insulative electrolyte(s), which can either be in a solid or a liquid state, or in combination. When an external circuit, or a load, is connected to a terminal that is connected to the negative electrode and to a terminal that is connected to the positive electrode, the battery drives electrons through the external circuit, while ions migrate through the electrolyte.

Batteries can be classified in a variety of manners. For example, batteries that are completely discharged only once are often referred to as primary batteries or primary cells. In contrast, batteries that can be discharged and recharged more than once are often referred to as secondary batteries or secondary cells. The ability of a cell or battery to be charged and discharged multiple times depends on the Faradaic efficiency of each charge and discharge cycle.

While rechargeable batteries based on sodium can comprise a variety of materials and designs, most, if not all, sodium batteries requiring a high Faradaic efficiency employ a solid primary electrolyte separator, such as a solid ceramic primary electrolyte membrane. The principal advantage of using a solid ceramic primary electrolyte membrane is that the Faradaic efficiency of the resulting cell approaches 100%. Indeed, in almost all other cell designs electrode solutions in the cell are able to intermix over time and, thereby, cause a drop in Faradaic efficiency and loss of battery capacity.

The primary electrolyte separators used in sodium batteries that require a high Faradaic efficiency often consist of ionically conducting polymers, porous materials infiltrated with ionically conducting liquids or gels, or dense ceramics. In this regard, most, if not all, rechargeable sodium batteries that are presently available for commercial applications comprise a molten sodium metal negative electrode, a sodium β"-alumina ceramic electrolyte separator, and a molten positive electrode, which may include a composite of molten sulfur and carbon (called a sodium/sulfur cell), or molten $NiCl_2$, NaCl, and $NaAlCl_4$ (called a ZEBRA cell). Because these conventional high temperature sodium-based rechargeable batteries have relatively high specific energy densities and only modest power densities, such rechargeable batteries are typically used in certain specialized applications that require high specific energy densities where high power densities are typically not encountered, such as in stationary storage and uninterruptable power supplies.

Despite the beneficial characteristics associated with some conventional sodium-based rechargeable batteries, such batteries may have significant shortcomings. In one example, because the sodium β"-alumina ceramic electrolyte separator is typically more conductive and is better wetted by molten sodium at a temperature in excess of about 270° C. and/or because the molten positive electrode typically requires relatively high temperatures (e.g., temperatures above about 170° or 180° C.) to remain molten, many conventional sodium-based rechargeable batteries operate at temperatures higher than about 270° C. and are subject to significant thermal management problems and thermal sealing issues. For example, some sodium-based rechargeable batteries may have difficulty dissipating heat from the batteries or maintaining the negative electrode and the positive electrode at the relatively high operating temperatures. In another example, the relatively high operating temperatures of some sodium-based batteries can create significant safety issues. In still another example, the relatively high operating temperatures of some sodium-based batteries require their components to be resistant to, and operable at, such high temperatures. Accordingly, such components can be relatively expensive. In yet another example, because it may require a relatively large amount of energy to heat some conventional sodium-based batteries to the relatively high operating temperatures, such batteries can be expensive to operate and energy inefficient.

Thus, while molten sodium-based rechargeable batteries are available, challenges with such batteries also exist, including those previously mentioned. Accordingly, it would be an improvement in the art to augment or even replace certain conventional molten sodium-based rechargeable batteries with other molten sodium-based rechargeable batteries.

BRIEF SUMMARY OF THE INVENTION

The present invention provides a molten sodium secondary cell (or rechargeable battery) that functions at a temperature between about 100° C. and about 150° C. While the described molten sodium secondary cell can include any suitable component, in some non-limiting implementations, the cell includes a sodium metal negative electrode, a positive electrode compartment that includes a positive electrode comprising a sodium intercalation material in a molten sodium FSA electrolyte. The disclosed secondary cell utilizes a sodium ion conductive electrolyte membrane physically separating the molten sodium negative electrode from the sodium intercalation electrode.

Generally, the sodium negative electrode comprises an amount of sodium metal. In this regard, as the cell operates, the sodium negative electrode is in a liquid or molten state. While the sodium negative electrode may comprise any suitable type of sodium, including without limitation, a pure sample of sodium or a sodium alloy, in some non-limiting implementations, the negative electrode comprises a sodium sample that is substantially pure.

The positive electrode in the positive electrode compartment can comprise any suitable material that allows the cell to function as intended. Indeed, in some non-limiting implementations, the positive electrode comprises a sodium intercalation material. Non-limiting examples of sodium intercalation materials include $Na_xMnO_2$, $Na_xCrO_2$, $Na_xNiO$, and $Na_xFe_y(PO_4)_z$ where x, y, and z are between 0 and about 4. In one embodiment, the sodium intercalation materials include $Na_xMnO_2$, $Na_xCrO_2$, $Na_xNiO$ where x is between 0 and 1.

The positive electrode may further comprise a current collector configured in the form of a wire, felt, mesh, plate, tube, foam, or other suitable electrode configuration.

The positive electrode compartment can comprise a molten sodium-FSA (sodium-bis(fluorosulfonyl)amide) electrolyte that is capable of conducting sodium ions to and from the electrolyte membrane and that otherwise allows the cell to function as intended. Na—FSA has the following structure:

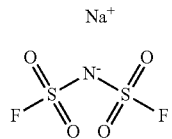

Na—FSA has a melting point of about 107° C., such that it is molten at typical operating temperatures of the molten sodium secondary cell. Na—FSA has a conductivity in the range of about 50-100 $mS/cm^2$.

The sodium ion conductive electrolyte membrane can comprise any membrane (which is used herein to refer to any suitable type of separator) that: selectively transports sodium ions, that is stable at the cell's operating temperature, that is stable when in contact with molten sodium and the molten sodium-FSA electrolyte, and that otherwise allows the cell to function as intended. Indeed, in some non-limiting implementations, the electrolyte membrane comprises a NaSICON-type membrane.

Where the electrolyte membrane comprises a NaSICON-type membrane, the membrane can comprise any suitable kind of NaSICON-type membrane, including, without limitation, a composite NaSICON membrane. In this regard, and by way of non-limiting illustration, the membrane can comprise any known or novel composite NaSICON membrane that includes a dense NaSICON layer and a porous NaSICON layer.

The described secondary cell may operate at any suitable operating temperature. Indeed, in some non-limiting implementations, the cell functions (e.g., is discharged or recharged) while the temperature of the cell is at least as high as a temperature selected from about 100° C., about 110° C., 120° C., and about 130° C. In some non-limiting implementations, the cell functions at a temperature less than a temperature selected from about 150° C. and about 130° C. Indeed, in some non-limiting implementations, as the cell functions, the temperature of the negative electrode is about 120° C.±about 10° C. In some non-limiting implementations, as the cell functions, the temperature of the positive electrode is sufficient to melt the sodium-FSA electrolyte. Such temperatures will typically be above about 107° C. The temperature of the positive electrode may be about 120° C.±about 10° C. In some embodiments, the cell is pressurized ranging from about 1 psi to about 30 psi. In some embodiments, the cell is pressurized ranging from about 1 psi to about 30 psi. In one embodiment, the cell may be pressurized in a range of about 10 psi to about 15 psi.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

FIG. 1 depicts a schematic diagram of a representative embodiment of a molten sodium secondary cell, wherein the cell is in the process of being discharged.

FIG. 2 depicts a schematic diagram of a representative embodiment of the molten sodium secondary cell, wherein the cell is in the process of being recharged.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable sodium negative electrodes, positive electrode materials, liquid positive electrode solutions, sodium ion conductive electrolyte membrane, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As stated above, secondary cells can be discharged and recharged and this specification describes cell arrangements and methods for both states. Although the term "recharging" in its various forms implies a second charging, one of skill in the art will understand that discussions regarding recharging would be valid for, and applicable to, the first or initial charge, and vice versa. Thus, for the purposes of this specification, the terms "recharge," "recharged" and "rechargeable" shall be interchangeable with the terms "charge," "charged" and "chargeable" respectively.

The present invention provides a molten sodium secondary cell that functions at an operating temperature between about 100° C. and about 150° C. While the described cell can comprise any suitable component, FIG. 1 shows a representative embodiment in which the molten sodium secondary cell 10 comprises a negative electrode compartment 15 that includes a sodium metal negative electrode 20 and a positive electrode compartment 25 that comprises a positive electrode. The positive electrode includes a current collector 30 and a sodium intercalation electrode material "A" disposed in a molten sodium-FSA (sodium-bis(fluorosulfonyl)amide) electrolyte 35. A sodium ion conductive electrolyte membrane 40 separates the negative electrode from the positive electrolyte and a first terminal 45 from a second terminal 50. To provide a better understanding of the described cell 10, a brief description of how the cell functions is provided below. Following this discussion, each of the cell's components shown in FIG. 1 is discussed in more detail.

Turning now to the manner in which the molten sodium secondary cell 10 functions, the cell can function in virtually any suitable manner. In one example, FIG. 1 illustrates that as the cell 10 is discharged and electrons (e⁻) flow from the negative electrode 20 (e.g., via the first terminal 45), sodium is oxidized from the negative electrode 20 to form sodium ions (Na⁺). FIG. 1 shows that these sodium ions are respectively transported from the sodium negative electrode 20, through the sodium ion conductive membrane 40, and to the positive electrolyte 35.

In a contrasting example, FIG. 2 shows that as the secondary cell 10 is recharged and electrons (e⁻) flow into the sodium negative electrode 20 from an external power source (not shown), such as a recharger, the chemical reactions that occurred when the cell 10 was discharged (as shown in FIG. 1) are reversed. Specifically, FIG. 2 shows that as the cell 10 is recharged, sodium ions (Na⁺) are respectively transported from the positive electrolyte 35, through the electrolyte membrane 40, and to the negative electrode 20, where the sodium ions are reduced to form sodium metal (Na).

Referring now to the various components of the cell 10, the cell, as mentioned above, can comprise a negative electrode compartment 15 and a positive electrode compartment 25. In this regard, the two compartments can be any suitable shape and have any other suitable characteristic that allows the cell 10 to function as intended. By way of example, the negative electrode and the positive electrode compartments can be tubular, rectangular, or be any other suitable shape. Furthermore, the two compartments can have any suitable spatial relationship with respect to each other. For instance, while FIG. 2 shows that the negative electrode compartment 15 and the positive electrode compartment 25 can be adjacent to each other, in other embodiments (not shown), one compartment (e.g., the negative electrode compartment) is disposed, at least partially, in the other compartment (e.g., the positive electrode compartment), while the contents of the two compartments remain separated by the electrolyte membrane 40 and any other compartmental walls.

With respect to the negative electrode 20, the cell 10 can comprise any suitable sodium negative electrode 20 that allows the cell 10 to function (e.g., be discharged and recharged) as intended. Some examples of suitable sodium negative electrode materials include, but are not limited to, a sodium sample that is substantially pure and a sodium alloy comprising any other suitable sodium-containing negative electrode material. In certain embodiments, however, the negative electrode comprises or consists of an amount of sodium that is substantially pure. In such embodiments, because the melting point of pure sodium is around 98° C., the sodium negative electrode will become molten above that temperature.

With respect to the positive current collector 30, the positive electrode compartment 25 can comprise any suitable positive electrode that allows the cell to be charged and discharged as intended. For instance, the positive electrode can comprise virtually any current collector 30 in combination with a sodium intercalation material, shown generically as "A" in FIGS. 1 and 2, in a molten sodium-FSA electrolyte 35.

In some embodiments, the positive current collector may comprise a wire, felt, plate, tube, mesh, foam, and/or other suitable current collector configuration. In some non-limiting embodiments, the sodium intercalation material ("A") is selected from $Na_xMnO_2$, $Na_xCrO_2$, $Na_xNiO$, and $Na_xFe_y(PO_4)_z$ where x, y, and z are between 0 and about 4. In one embodiment, the sodium intercalation materials include $Na_xMnO_2$, $Na_xCrO_2$, $Na_xNiO$ where x is between 0 and 1.

In some non-limiting embodiments, the reactions that occur at the negative electrode and at the positive electrode and the overall reaction as the cell 10 is discharged may occur as illustrated below:

Negative electrode $xNa \leftrightarrow xNa^+ + xe^-$
Positive electrode $A + xe^- \leftrightarrow A^{-x}$
Overall $xNa + A \leftrightarrow Na_xA$ Accordingly, some embodiments of the describe cell 10, at least theoretically, are capable of producing about 3.2V±0.5V at standard temperature and pressure.

Moreover, some examples of overall reactions that may occur during the discharging and charging of a cell in which the positive electrode 30 comprises a $Na_xMnO_2$ intercalation material, the negative electrode 20 comprises sodium, and the positive electrolyte 35 comprises molten sodium-FSA, are shown below:

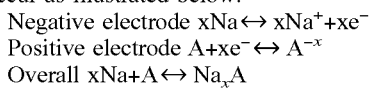
(Discharge) $xNa + MnO_2 \leftrightarrow Na_xMnO_2$
(Charge) $Na_xMnO_2 \rightarrow MnO_2 + xNa$ With respect now to the molten sodium-FSA positive electrolyte 35, the positive electrolyte has been found to have good sodium ion conductivity that allows the cell 10 to function as intended. It is intended for the positive electrolyte to have a higher sodium ion conductivity than the electrolyte membrane 40. The molten sodium-FSA conductivity ranges between about 50 mS/cm and 100 mS/cm. The NaSICON conductivity may range between about 20 and about 50 mS/cm. The NaSICON conductivity may range between about 30 and about 45 mS/cm.

With regards now to the sodium ion conductive electrolyte membrane 40, the membrane can comprise any suitable material that selectively transports sodium ions and permits the cell 10 to function with the molten sodium negative electrode and the positive electrolyte. In some embodiments, the electrolyte membrane comprises a NaSICON-type (sodium Super Ion CONductive) material. In such embodiments, the NaSICON-type material may comprise any known or novel NaSICON-type material that is suitable for use with the described cell 10. Some non-limiting examples of NaSICON-type compositions include, but are not limited to, $Na_3Zr_2Si_2PO_{12}$, $Na_{1+x}Si_xZr_2P_{3-x}O_{12}$ (where x is selected from 1.6 to 2.4), Y-doped NaSICON ($Na_{1+x+y}Zr_{2-y}Y_ySi_xP_{3-x}O_{12}$, $Na_{1+x}Zr_{2-y}Y_ySi_xP_{3-x}O_{12-y}$ (where x=2, y=0.12), and Fe-doped NaSICON ($Na_3Zr_2/_3Fe_4/_3P_3O_{12}$). Indeed, in certain embodiments, the NaSICON-type membrane comprises $Na_3Si_2Zr_2PO_{12}$. In still other embodiments, the NaSICON-type membrane comprises known or novel composite, cermet-supported NaSICON membrane. In such embodiments, the composite NaSICON membrane can comprise any suitable component, including, without limitation, a porous NaSICON-cermet layer that comprises NiO/NaSICON or any other suitable cermet layer, and a dense NaSICON layer. In yet other embodiments, the NaSICON membrane comprises a monoclinic ceramic.

Where the cell's electrolyte membrane 40 comprises a NaSICON-type material, the NaSICON-type material may provide the cell 10 with several beneficial characteristics. In one example, because such membranes selectively transport sodium ions but do not allow the negative electrode 20 and the positive electrolyte 35 to mix, such membranes can help the cell to have minimal capacity fade and to have a relatively stable shelf life at ambient temperatures.

With reference now to the terminals 45 and 50, the cell 10 can comprise any suitable terminals that are capable of electrically connecting the cell with an external circuit, including without limitation, to one or more cells. In this regard, the terminals can comprise any suitable material and any suitable shape of any suitable size.

In addition to the aforementioned components, the cell 10 can optionally comprise any other suitable component. By way of non-limiting illustration FIG. 2 shows an embodiment in which the cell 10 comprises a heat management system 55, 60. Independent heat management systems may be associated with the negative electrode and positive electrode compartments. Alternatively, a single heat management system may be disposed in only one compartment. In such embodiments, the cell can comprise any suitable type of heat management system that is capable of maintaining the cell within a suitable operating temperature range. Some examples of such heat management systems include, but are not limited to, a heater, one or more temperature sensors, and appropriate temperature control circuitry.

The described cell 10 may function at any suitable operating temperature. In other words, as the cell is discharged and/or recharged, the sodium negative electrode and the positive electrolyte may have any suitable temperature. The negative and positive electrode compartments may operate at the same or different temperatures. Indeed, in some embodiments, the cell functions at an operating temperature that is as high as a temperature selected from about 120° C., about 130° C., and about 150° C. Moreover, in such embodiments, as the cell functions, the temperature of the negative and/or positive electrode compartments can be as low as a temperature selected from about 120° C., about 115° C., about 110° C., and about 100° C. Indeed, in some embodiments, as the cell functions, the temperature of the negative and/or positive electrode compartments may be between about 100° C. and about 150° C. In other embodiments, the cell functions at a temperature between about 110° C. and about 130° C. In yet other embodiments, however, as the cell functions, the temperature of the negative and/or positive electrode compartments is about 120° C.±about 10° C.

In addition to the aforementioned benefits of the cell 10, the described cell may have several other beneficial characteristics. By way of example, by being able to operate in a temperature range between about 100° and about 150° C., the cell 10 may operate in a temperature range that is significantly lower the operating temperature of certain conventional molten sodium rechargeable batteries. Accordingly, the described cell may require less energy to heat and/or dissipate heat from the cell as the cell functions, may be less dangerous use or handle, and may be more environmentally friendly.

The following examples are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

While specific embodiments and examples of the present invention have been illustrated and described, numerous modifications come to mind without significantly departing from the spirit of the invention, and the scope of protection is only limited by the scope of the accompanying claims.

The invention claimed is:

1. A molten sodium secondary cell, comprising:
   a negative electrode compartment having a temperature between 100° C. and 150° C. comprising a molten sodium metal negative electrode, which electrochemically oxidizes to release sodium ions during discharge and electrochemically reduces sodium ions to sodium metal during recharging;
   a positive electrode compartment comprising a positive electrode disposed in a molten positive electrolyte consisting of NaFSA (sodium bis(fluorosulfonyl)amide) having a temperature between 100° C. and 150° C., wherein the positive electrode comprises a sodium intercalation electrode selected from $Na_xMnO_2$, $Na_xCrO_2$, $Na_xNiO$ and $Na_xFe_y(PO_4)_z$, wherein x is between 0 and 4, y is between 0 and 4, and z is between 0 and 4; and
   a sodium ion conductive electrolyte membrane comprising a NaSICON material that separates the sodium metal negative electrode from the molten positive electrolyte such that the molten positive electrolyte does not contact the molten sodium metal negative electrode,
   wherein the molten sodium metal negative electrode is in contact with the conductive electrolyte membrane.

2. The secondary cell of claim 1, wherein the NaSICON material comprises a composite membrane having a porous layer and a dense functional layer.

3. The secondary cell of claim 1, wherein the negative electrode compartment has a temperature between 110° C. and 130° C.

4. The secondary cell of claim 1, wherein the sodium intercalation electrode comprises $Na_xMnO_2$, wherein x is between 0 and 1.

5. The secondary cell of claim 1, wherein the sodium intercalation electrode comprises $Na_xCrO_2$, wherein x is between 0 and 1.

6. The secondary cell of claim 1, wherein the sodium intercalation electrode comprises $Na_xNiO$ or $Na_xFe_y(PO_4)_z$, wherein x is between 0 and 4, y is between 0 and 4, and z is between 0 and 4.

7. The secondary cell of claim 1, further comprising a heat management system to control an operating temperature of the cell.

8. The secondary cell of claim 1, further comprising a heat management system disposed in the negative electrode compartment to control a temperature of the negative electrode compartment.

9. The secondary cell of claim 1, further comprising a heat management system disposed in the positive electrode compartment to control a temperature of the positive electrode compartment.

10. A molten sodium secondary cell, comprising:

a negative electrode compartment comprising a molten sodium metal negative electrode having a temperature between 110° C. and 130° C., which electrochemically oxidizes to release sodium ions during discharge and electrochemically reduces sodium ions to sodium metal during recharging;

a positive electrode compartment comprising a positive electrode disposed in a molten positive electrolyte consisting of NaFSA (sodium bis(fluorosulfonyl)amide) having a temperature between 110° C. and 130° C., wherein the positive electrode comprises a sodium intercalation electrode selected from $Na_xMnO_2$, $Na_xCrO_2$, $Na_xNiO$ and $Na_xFe_y(PO_4)_z$, wherein x is between 0 and 4, y is between 0 and 4, and z is between 0 and 4;

a sodium ion conductive electrolyte membrane comprising a NaSICON material that separates the molten sodium metal negative electrode from the molten positive electrolyte such that the molten positive electrolyte does not contact the molten sodium metal negative electrode; and a heat management system to control an operating temperature of the cell, wherein the sodium metal negative electrode is molten and in contact with the conductive electrolyte membrane as the cell operates.

* * * * *